INVENTOR.
WILLIAM L. HOERRNER
BY
Agent

Dec. 31, 1963 W. L. HOERRNER 3,116,041
AIRCRAFT PROPULSION DISTRIBUTION SYSTEM
Filed Feb. 10, 1961 3 Sheets-Sheet 3

INVENTOR.
WILLIAM L. HOERRNER
BY
Agent

United States Patent Office 3,116,041
Patented Dec. 31, 1963

3,116,041
AIRCRAFT PROPULSION DISTRIBUTION SYSTEM
William L. Hoerrner, Marietta, Ga., assignor to Lockheed Aircraft Corporation, Burbank, Calif.
Filed Feb. 10, 1961, Ser. No. 88,571
6 Claims. (Cl. 244—23)

This invention relates to aircraft propulsion systems, and more particularly an ejector duct system for balancing the vertical thrust of more than one propulsive powerplant relative to the vertical C.G. of the aircraft.

A type of aircraft installation contemplated for this invention is as shown and described in co-pending application Serial Number 57,656, entitled "Aircraft Propulsion System," now Patent 3,085,770, issued April 16, 1963 and assigned to the same assignee as this application.

In S-VTOL aircraft of the type where propulsive thrust is directed or diverted in a downward direction to provide the vertical takeoff and landing or hover capabilities, a critical time is during those periods of the flight regime when there is little, if any, effective airflow over the aerodynamic control surfaces normally serving to effect control of the aircraft along the pitch, roll and yaw axes. This period becomes even more critical where the downward directed or diverted propulsive thrust is provided by more than one powerplant in that a partial or complete loss of power from one engine will produce an asymmetric thrust unless the vertical thrust from all operating powerplants is appropriately and properly distributed relative to the vertical axis of the aircraft's center of gravity. With an appropriate distribution of thrust forces, a partial or complete power failure by any one powerplant, or even a partial power failure by all powerplants, will not cause or compound pilot difficulties at a time of possible emergency.

Accordingly, it is an object of this invention to provide a propulsive fluid distribution system to prevent asymmetric vertical thrust relative to the C.G. vertical axis of an aircraft.

A further object of this invention is to provide a propulsive fluid distribution system having a balanced and symmetric vertical thrust pattern relative to the C.G. vertical axis of the aircraft.

Another object of this invention is to provide a propulsive fluid distribution system for an aircraft manifolded to receive propulsive fluid from more than one engine while still providing balanced vertical thrust relative to the C.G. vertical axis regardless of whether there is a partial thrust loss or one powerplant completely being shut down.

A further object of this invention is to provide a propulsive fluid distribution system in an aircraft whereby individual engine duct systems are arranged in a manner minimizing complications of engine operation and starting due to engine cross flows.

Still another object of this invention is to provde a propulsive fluid distribution system in an aircraft whereby an engine or engines on one side of the aircraft supply specific ejector nozzles which are isolated from engine flows from the other side of the aircraft while the nozzle pressure ratios are affected only by the operation of the engines supplying those nozzles.

Other objects and advantages will become apparent from the following description taken in connection with the accompanying drawings in which.

Generally stated, the invention comprises a primary distribution duct for each individual or group of powerplants, said primary duct connected to the powerplant to receive propulsive fluid therefrom. The primary ducts are arranged in substantially parallel alignment relative to each other, and each includes a plurality of secondary distribution ducts which serve as crossover tubes to deliver the propulsive fluid from the primary ducts to a plurality of primary ejector nozzles to each of at least a pair of downwardly directed ejector passages. The secondary ducts of each primary duct being intercalated with the secondary ducts of the other primary duct whereby the primary nozzle pattern is symmetrical relative to the center of gravity vertical axis of the aircraft. Likewise, the primary nozzles discharging the propulsive fluid from the primary and secondary ducts are arranged symmetrically about the vertical axis of the aircraft's center of gravity.

Figure 1:
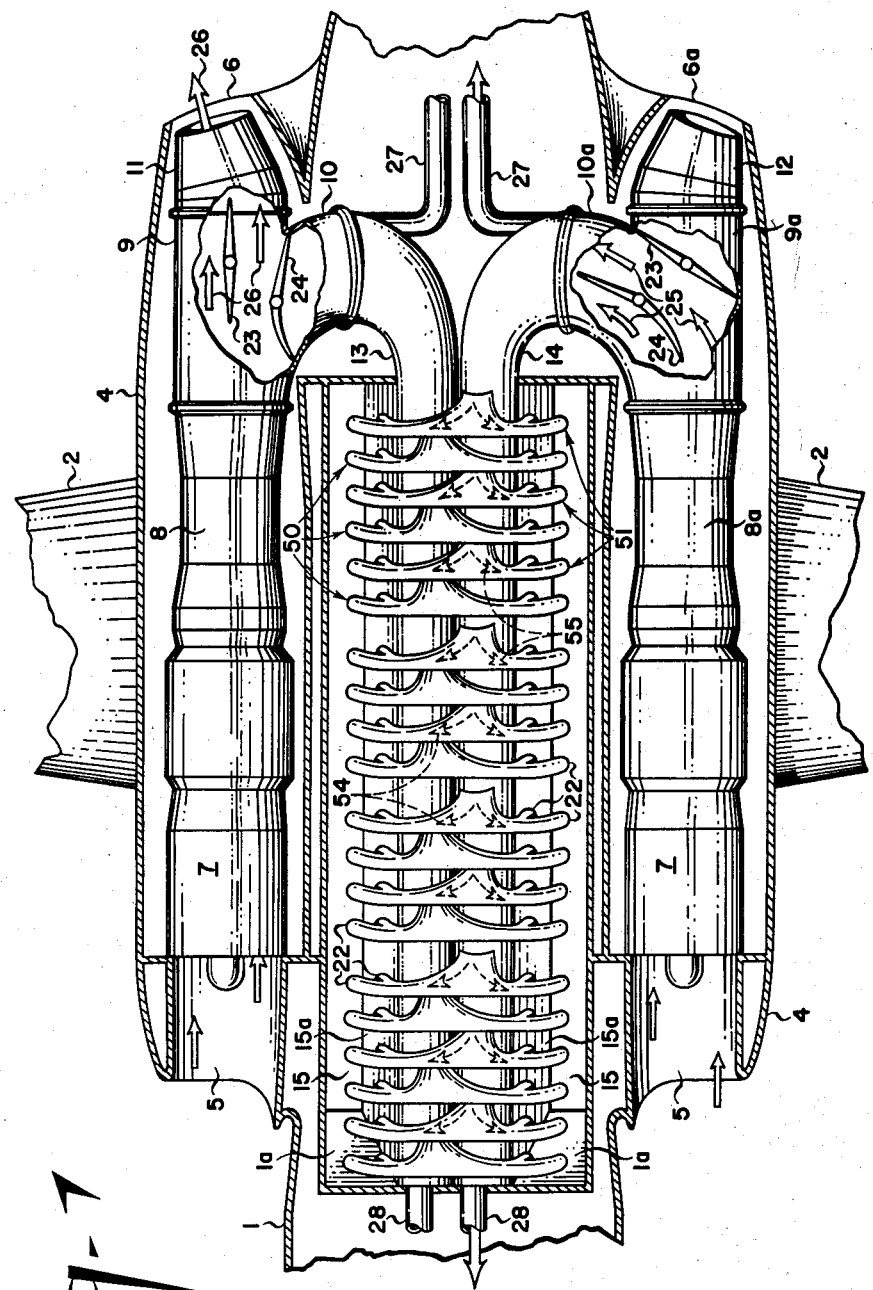
FIGURE 1 is a partial cross-sectional view showing an aircraft propulsion gas flow system incorporating one embodiment of this invention.
Figure 2:
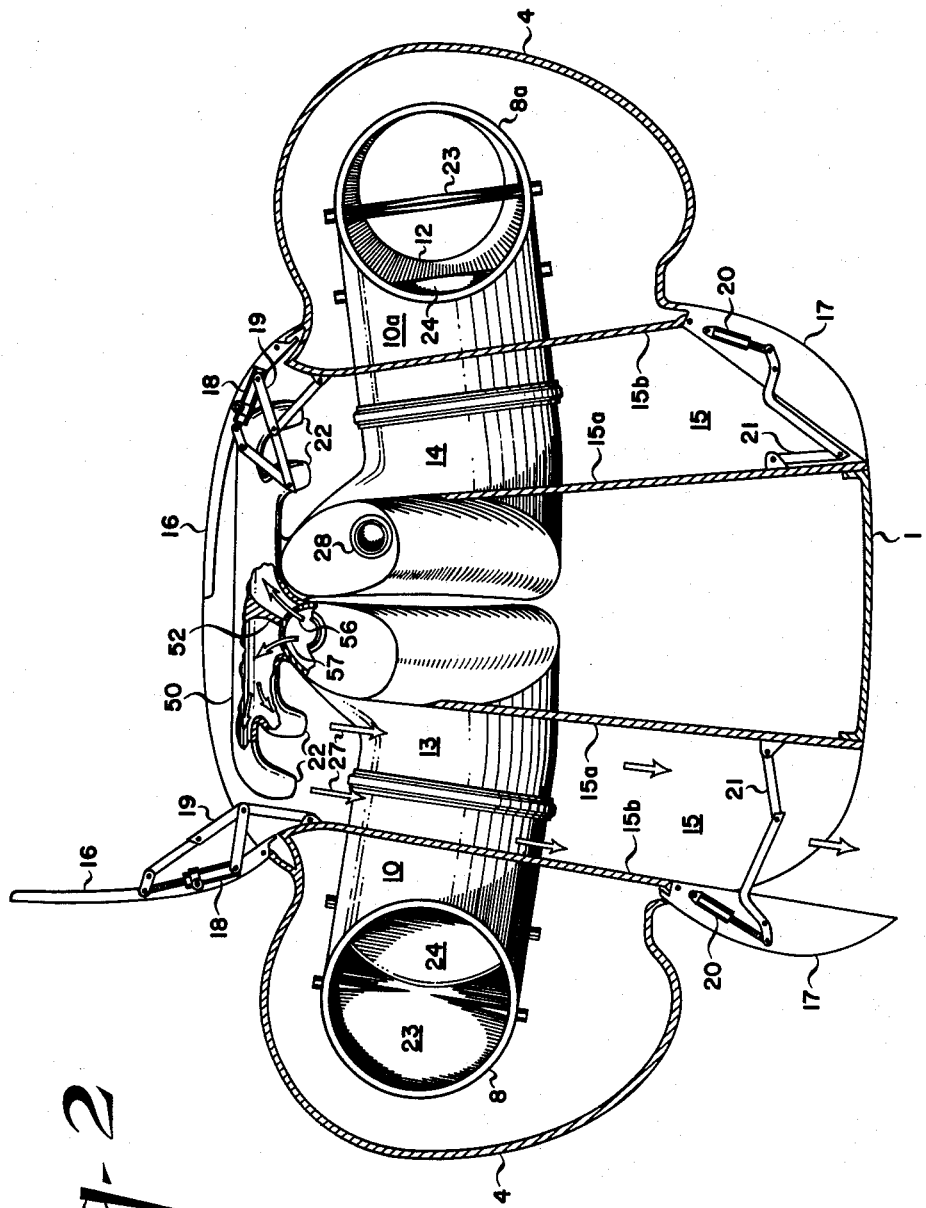
FIGURE 2 is a transverse cross-sectional view of the fuselage of the aircraft in FIGURE 1 showing the left hand upper and lower doors open and the right hand upper and lower doors in closed position.

Referring more particularly to FIGURES 1 and 2 of the drawings, the propulsion system, as more particularly described in the above identified co-pending application Serial Number 57,656 (not Patent 3,085,770), comprises a turbo-jet powerplant 7 on each side of the aircraft fuselage receiving ambient air from inlets 5 and discharging into propulsive ducts 8 and 8a, each of which is bifurcated into duct branches 9 and 10 and 9a and 10a respectively. The duct branches 9 and 9a discharge the propulsive fluid flows from the powerplant 7 into nozzles 11 and 12 respectively for horizontal thrust when the valve members 23 and 24 are in the positions as shown in the upper portion of FIGURE 1. When the valve members 23 and 24 are in the position shown in the lower portion of FIGURE 1, the propulsive fluid from the powerplant 7 flows into primary ducts 13 and 14 through duct branches 10 and 10a respectively; the operation and details of valve members 23 and 24 as more particularly described and claimed in co-pending application Serial Number 58,604, entitled "Fluid Flow Directing Arrangement and Method of Operation" and assigned to the same assignee as this application.

When the propulsive fluid is directed into primary ducts 13 and/or 14, the propulsive fluid is ejected from nozzles 22 extending in a downward direction, the specific propulsive fluid discharge in the embodiment depicted in the drawings being downwardly into an ejector passage 15 extending vertically through the aircraft fuselage when upper doors 16 and lower doors 17 are open. In this manner, the nozzles 22 serve as jet pumps with the propulsive fluid from nozzles 22 serving as the primary fluid mixing with secondary ambient air aspirated through the opening on the top of the fuselage, the primary and secondary propulsive fluids mixing in the ejector passages 15 for a downward directed augmented propulsive fluid flow.

Figure 3:
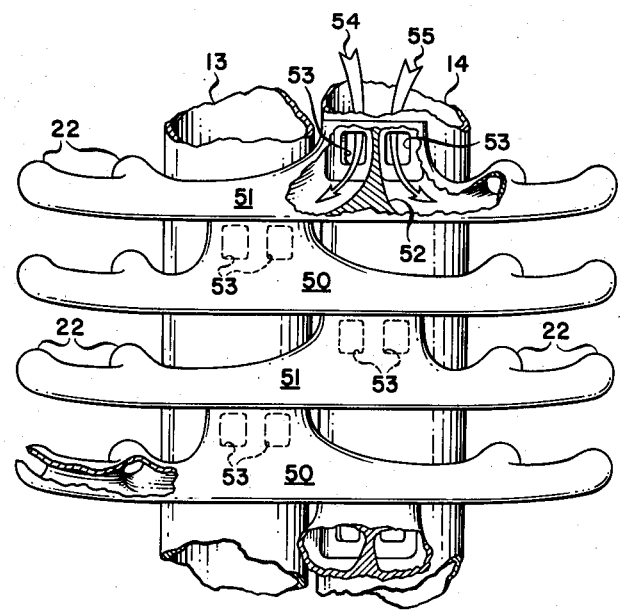
FIGURE 3 shows the enlarged details of the primary ducts and distribution and intercalation of the secondary distribution ducts and primary nozzles.

As can best be seen in FIGURES 1 and 3, each of the primary ducts 13 and 14 has a plurality of secondary crossover ducts connected thereto, the secondary crossover devices connected to primary duct 13 being identified by the numeral 50, while the secondary crossover ducts connected to primary duct 14 are identified by the numeral 51. Each of the secondary crossover ducts is separated or divided into two internal flow paths by a center or dividing wall 52 so as to provide in essence two separate flows from the primary duct as can best be seen in FIGURE 3. Referring to FIGURE 3, there is a pair of openings 53 in the wall of primary duct 14, the wall 52 engaging the outer surface of primary duct 14. In this manner, one branch of propulsive fluid flow from primary duct 14, as exemplified by flow arrow 54, will enter crossover tube 51 and be carried up and over primary duct 13 to flow out of the nozzles 22 on the opposite side of the other primary duct 13. The other flow path, as indicated by a flow arrow 55, passes into secondary crossover duct 51 to exit from nozzles 22 adjacent the side of primary duct 14. Likewise, the propulsive fluid flow into a crossover duct 50 from primary duct 13, which can best be seen in FIGURE 2, has that portion of the propulsive fluid flow indicated by flow arrow 56 passing on one side of center wall 52 to pass up and over primary duct 14 to exit through nozzles 22 on the opposite side of the other primary duct 14, while the flow indicated by flow arrow 57 enters secondary duct 50 on the opposite side of wall 52 to exit from the nozzles 22 adjacent the primary duct 13.

In operation, when it is desired to obtain vertical thrust, the valves 23 and 24 may be placed in the positions as shown in the lower portion of FIGURE 1 whereby valves 23 are closed and valves 24 are open, thereby diverting all the propulsive fluid from the powerplants into the primary ducts 13 and 14. It is also to be understood that if two or more powerplants are mounted on each side of the fuselage, then the propulsive fluid flows from the two or more powerplants on each side may be ducted into a common primary duct 13 or 14 and thereby achieving the same results of thrust balance in each ejector duct and balance relative to the aircraft center of gravity vertical axis. From the embodiment shown in the drawings where there is only one powerplant on each side of the aircraft fuselage, a complete or partial power loss from one powerplant will not produce any thrust asymmetry since the crossover tubes from each primary duct 13 or 14 are intercalated and balanced in a longitudinal sense relative to the vertical axis through the C.G. of the aircraft. Likewise, should two or more powerplants be mounted on each side of the aircraft and all the propulsive fluids directed into one of the primary ducts 13 or 14, a partial power loss of one of the powerplants or even the complete loss of a powerplant on one side of the aircraft will not result in thrust asymmetry due to this novel arrangement, although it must of course be realized that there will be a reduction in the total vertical thrust.

Thus it can be seen, by use of this novel propulsion system, a vertical thrust can be accomplished from more than one powerplant whereby symmetry of the vertical thrust is accomplished at all times regardless of the presence or lack of equal power outputs from all of the powerplants or even the presence or lack of equal number of operating powerplants on each side of the vertical center plane of the aircraft.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In an aircraft fuselage having at least two ejector passages extending substantially vertically through the fuselage and laterally spaced from the vertical centerplane of the fuselage, a symmetrical vertical thrust arrangement comprising a pair of fluid ducts extending longitudinally between the ejector passages, a pressurized fluid source for each duct and connected thereto, and an independent means conducting pressurized fluid from each said duct to said ejector passages, said conducting means adapted to discharge each propulsive fluid flow independent of the other fluid flow into the ejector passages symmetrically about the vertical axis of the aircraft center of gravity to avoid asymmetric vertical thrust upon a partial or complete loss of one pressurized fluid source relative to the other said source.

2. In an aircraft fuselage having at least two ejector passages extending substantially vertically through the fuselage and laterally spaced from the vertical centerplane of the fuselage, a propulsive fluid distribution system comprising a first and a second primary fluid duct each having a pressurized fluid source connected thereto for supply of a propulsive fluid to said ducts, said primary ducts extending longitudinally between said ejector passages, and a plurality of secondary duct means for each primary duct and connected thereto, each of said secondary duct means arranged to discharge propulsive fluid flow from its primary duct independent of the other primary duct into an ejector passage on each side of the longitudinal vertical centerplane of the fuselage, all of the secondary duct means arranged to discharge the propulsive fluid flows into the ejector passages symmetrically about the vertical axis of the aircraft center of gravity to avoid asymmetric vertical thrust upon a partial or complete loss of one pressurized fluid source relative to the other said source.

3. In an aircraft fuselage having at least two ejector passages extending substantially vertically through the fuselage and laterally spaced from the vertical centerplane of the fuselage, a propulsive fluid distribution system comprising a first and a second primary fluid duct each having a pressurized fluid source connected thereto for supply of a propulsive fluid to said ducts, said primary ducts extending longitudinally between said ejector passages, and a plurality of secondary duct means for each primary duct and connected thereto, each of said secondary duct means having at least two jet pump discharge nozzles arranged to discharge the propulsive fluid flow from its primary duct into an ejector passage on each side of the longitudinal vertical centerplane of the fuselage, all of the secondary duct means arranged to discharge the propulsive fluid flows into the ejector passages symmetrically about the vertical axis of the aircraft center of gravity to avoid asymmetric vertical thrust upon a partial or complete loss of one pressurized fluid source relative to the other said source.

4. In an aircraft fuselage having at least two ejector passages extending substantially vertically through the fuselage and laterally spaced from the vertical centerplane of the fuselage, a propulsive fluid distribution system comprising a first and a second primary fluid duct each having a pressurized fluid source connected thereto for supply of a propulsive fluid to said ducts, said primary ducts extending longitudinally between said ejector passages, and a plurality of secondary duct means for each primary duct and connected thereto wherein the axes of the secondary duct means are at right angles to the axes of the primary ducts, each of said secondary duct means arranged to discharge propulsive fluid flow from its primary duct into an ejector passage on each side of the longitudinal vertical centerplane of the fuselage, all of the secondary duct means arranged to discharge the propulsive fluid flows into the ejector passages symmetrically about the vertical axis of the aircraft center of gravity to avoid asymmetric vertical thrust upon a partial or complete loss of one pressurized fluid source relative to the other said source.

5. In an aircraft fuselage having at least two ejector passages extending substantially vertically through the fuselage and laterally spaced from the vertical centerplane of the fuselage, a propulsive fluid distribution system comprising a first and second primary fluid duct each having a pressurized fluid source connected thereto for supply of a propulsive fluid to said ducts, said primary ducts extending longitudinally between said ejector passages, and a plurality of secondary duct means for each primary duct and connected thereto, each of said secondary duct means having two flow paths arranged to discharge propulsive fluid flow from its primary duct into the ejector passages, one flow path from each primary duct being up and over the opposite primary duct to be ejected into the ejector passage along the opposite side of said other primary duct, and the second flow path being to the ejector passage adjacent the primary duct the fluid flow is from, all of the secondary duct means arranged to discharge the propulsive fluid flows into the ejector passages symmetrically about the vertical axis of the aircraft center of gravity to avoid asymmetric vertical thrust upon a partial or complete loss of one pressurized fluid source relative to the other said source.

6. In an aircraft fuselage having at least two ejector passages extending substantially vertically through the fuselage and laterally spaced from the vertical centerplane of the fuselage, a propulsive fluid distribution system comprising a first and a second primary fluid duct each having a pressurized fluid source connected thereto for supply of a propulsive fluid to said ducts, said primary ducts extending longitudinally between said ejector passages each having a plurality of longitudinally spaced pairs of wall openings, a secondary duct means for each pair of openings in said primary ducts, each secondary duct means having a pair of flow passages from intermediate its ends with one passage extending to a nozzle at one end and the other passage extending to a nozzle at the other end, each of said secondary duct means connected to a primary duct with the secondary duct means passages in alignment with a pair of primary duct wall openings, each of said secondary duct means arranged to discharge propulsive fluid flow from its primary duct into an ejector passage on each side of the longitudinal vertical centerplane of the fuselage, the secondary duct means connected to one primary duct intercalated with the secondary duct means of the other primary duct to provide the propulsive fluid flow discharge into the ejector passages symmetrically about the vertical axis of the aircraft center of gravity to avoid asymmetric vertical thrust upon a partial or complete loss of one pressurized fluid source relative to the other said source.

References Cited in the file of this patent
FOREIGN PATENTS
1,199,711  France _____ June 22, 1959